US012359789B2

(12) United States Patent
Chien et al.

(10) Patent No.: US 12,359,789 B2
(45) Date of Patent: Jul. 15, 2025

(54) ILLUMINATING DEVICE HAVING TWO LIGHT SOURCES GENERATING DIFFERENT ETENDUES AND RESPECTIVE LIGHT RECEIVERS AND DISPLAY DEVICE

(71) Applicant: Qisda Corporation, Taoyuan (TW)

(72) Inventors: Chih-Shiung Chien, Taoyuan (TW); Ming-Kuen Lin, Taoyuan (TW); Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/830,495

(22) Filed: Sep. 10, 2024

(65) Prior Publication Data

US 2025/0102127 A1 Mar. 27, 2025

(30) Foreign Application Priority Data

Sep. 27, 2023 (CN) ........................ 202311257410.X

(51) Int. Cl.

| | |
|---|---|
| ***F21S 41/63*** | (2018.01) |
| ***F21S 41/12*** | (2018.01) |
| ***F21S 41/143*** | (2018.01) |
| ***F21S 41/148*** | (2018.01) |
| ***F21S 41/176*** | (2018.01) |
| ***F21S 41/27*** | (2018.01) |
| ***F21S 41/36*** | (2018.01) |

(52) U.S. Cl.

CPC ............... *F21S 41/63* (2018.01); *F21S 41/12* (2018.01); *F21S 41/143* (2018.01); *F21S 41/148* (2018.01); *F21S 41/176* (2018.01); *F21S 41/27* (2018.01); *F21S 41/36* (2018.01)

(58) Field of Classification Search

CPC ... G02B 27/141; G02B 27/30; F21Y 2115/10; F21S 41/176; F21S 41/141; F21S 41/143; F21S 41/147; F21S 41/25; F21S 41/148; F21S 41/36

See application file for complete search history.

(56) References Cited

U.S. PATENT DOCUMENTS

2003/0133079 A1* 7/2003 Cobb .................. H04N 9/3105 353/31

* cited by examiner

*Primary Examiner* — Robert J May

(57) ABSTRACT

Disclosed is an illuminating device, including first and second light sources, first and second light receiving elements, a display module, and a projection module. The first and second light sources are for generating first and second light beam respectively. The first and second light receiving elements, located on the optical paths of the first and second light beams respectively, are for converging the first and second light beams respectively. The display module, located on the optical paths of the first and the second light beams, receives the first and second light beams and generates corresponding first and second image beams respectively. The projection module, located on the optical paths of the first and second image beams, projects the first and second image beams. A first etendue of the first light beam is greater than a second etendue of the second light beam.

18 Claims, 10 Drawing Sheets

ILLUMINATING DEVICE HAVING TWO LIGHT SOURCES GENERATING DIFFERENT ETENDUES AND RESPECTIVE LIGHT RECEIVERS AND DISPLAY DEVICE

CROSS-REFERENCE TO RELATED APPLICATION

This application claims the priority benefit of China application serial no. 202311257410.X, filed on Sep. 27, 2023. The entirety of the above-mentioned patent application is hereby incorporated by reference herein and made a part of this specification.

BACKGROUND

Technical Field

The disclosure relates to an illuminating device.

Description of Related Art

When a vehicle is driven at night or under poor ambient lighting conditions, the visual field of the driver is affected, causing a severe impact on driving safety. Therefore, vehicles need to have good low beam illumination and high beam illumination at the same time. Low beam illumination is for illuminating nearer grounds in the front to ensure visibility. High beam illumination is for improving the visibility of the road at night so as to clarify the situation on the road in the distance.

SUMMARY

The disclosure provides an illuminating device to provide low beam illumination and high beam illumination at the same time.

An illuminating device of the disclosure includes: a first light source for generating a first light beam; a second light source for generating a second light beam; a first light receiving element located on an optical path of the first light beam and for converging the first light beam; a second light receiving element located on an optical path of the second light beam and for converging the second light beam; a display module, which is located on the optical path of the first light beam and the optical path of the second light beam, receives the first light beam and the second light beam and generates a first image beam corresponding to the first light beam and a second image beam corresponding to the second light beam; and a projection module, which is located on an optical path of the first image beam and an optical path of the second image beam, projects the first image beam and the second image beam, wherein the first light beam has a first etendue and the second light beam has a second etendue, and the first etendue is greater than the second etendue.

In an embodiment of the disclosure, a ratio of the first etendue to the second etendue is 10-50.

In an embodiment of the disclosure, the first light source is a light-emitting diode array or a phosphor.

In an embodiment of the disclosure, the second light source is a laser.

In an embodiment of the disclosure, each of the first light beam and the second light beam is a white light.

In an embodiment of the disclosure, the first light receiving element is a focusing lens or a collimating lens.

In an embodiment of the disclosure, the second light receiving element is a focusing lens or a collimating lens.

In an embodiment of the disclosure, an effective focal length of the first light receiving element is not equal to an effective focal length of the second light receiving element.

In an embodiment of the disclosure, the illuminating device further includes a reflective element. The reflective element is located on the optical path of the first light beam and at a downstream of the first light receiving element. The reflective element is for reflecting a part of the first light beam.

In an embodiment of the disclosure, the illuminating device further includes a reflective element. The reflective element is located on the optical path of the second light beam and at a downstream of the second light receiving element. The reflective element is for reflecting a part of the second light beam.

In an embodiment of the disclosure, the illuminating device further includes a light combining element. The light combining element is located on the optical path of the first light beam and at a downstream of the first light receiving element. A direction of travel of the first light beam is parallel to a direction of travel of the second light beam in response to the first light beam being incident on the light combining element and reflected by the light combining element.

In an embodiment of the disclosure, the illuminating device further includes a light combining element. The light combining element is located on the optical path of the second light beam and at a downstream of the second light receiving element. A direction of travel of the second light beam is parallel to a direction of travel of the first light beam in response to the second light beam being incident on the light combining element and reflected by the light combining element.

In an embodiment of the disclosure, the illuminating device further includes a light combining element. The light combining element is located on the optical path of the first light beam and the optical path of the second light beam. The light combining element is also located at a downstream of the first light receiving element and a downstream of the second light receiving element. A direction of travel of the first light beam is parallel to a direction of travel of the second light beam in response to the first light beam and the second light beam being incident on the light combining element and reflected by the light combining element, respectively.

In an embodiment of the disclosure, the illuminating device further includes a diffusion element. The diffusion element is located on the optical path of the first light beam and at a downstream of the first light receiving element. The diffusion element is for enabling the first light beam with a uniform energy distribution.

In an embodiment of the disclosure, the illuminating device further includes a diffusion element. The diffusion element is located on the optical path of the second light beam and at a downstream of the second light receiving element. The diffusion element is for enabling the second light beam with a uniform energy distribution.

In an embodiment of the disclosure, the illuminating device further includes a diffusion element. The diffusion element is located on the optical path of the first light beam and the optical path of the second light beam. The diffusion element is also located at a downstream of the first light receiving element and a downstream of the second light receiving element. The diffusion element is for enabling the first light beam and the second light beam with a uniform energy distribution.

In an embodiment of the disclosure, the display module is a digital mirror device, a penetrating display, or a reflective display.

In an embodiment of the disclosure, the first image beam includes the whole second image beam.

Based on the above, the illuminating device described in the disclosure utilizes light sources with different etendues to present a required energy distribution on the projected scene. In addition, by reducing the optical path, a plurality of groups of light sources are combined into the illuminating device and projected into the environment.

DESCRIPTION OF THE EMBODIMENTS

Figure 1:
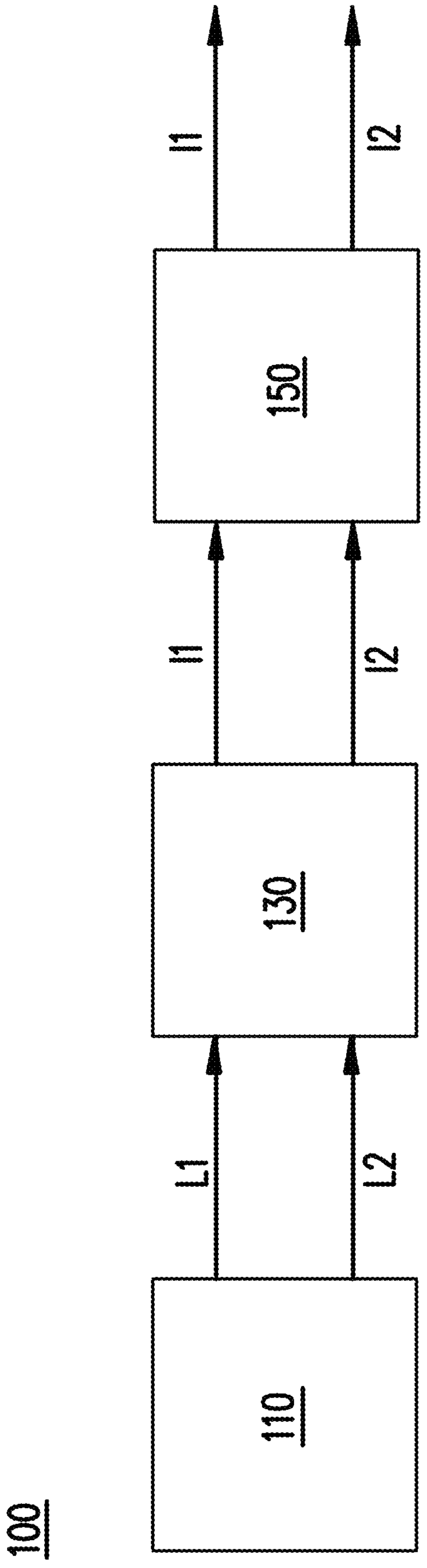
FIG. 1 is a block diagram of an illuminating device according to some embodiments of the disclosure.

FIG. 1 is a block diagram of an illuminating device according to some embodiments of the disclosure. An illuminating device 100 includes: a light source module 110, a display module 130, and a projection module 150. The light source module 110 is for generating a first light beam L1 and a second light beam L2. The display module 130 is located on an optical path of the first light beam L1 and an optical path of the second light beam L2. The display module 130 receives the first light beam L1 and the second light beam L2, and generates a first image beam I1 corresponding to the first light beam L1 and a second image beam I2 corresponding to the second light beam L2. The projection module 150 is located on an optical path of the first image beam I1 and an optical path of the second image beam I2, and for projecting the first image beam I1 and the second image beam I2.

The light source module 110, the display module 130, and the projection module 150 are separately described below.

Figure 2:
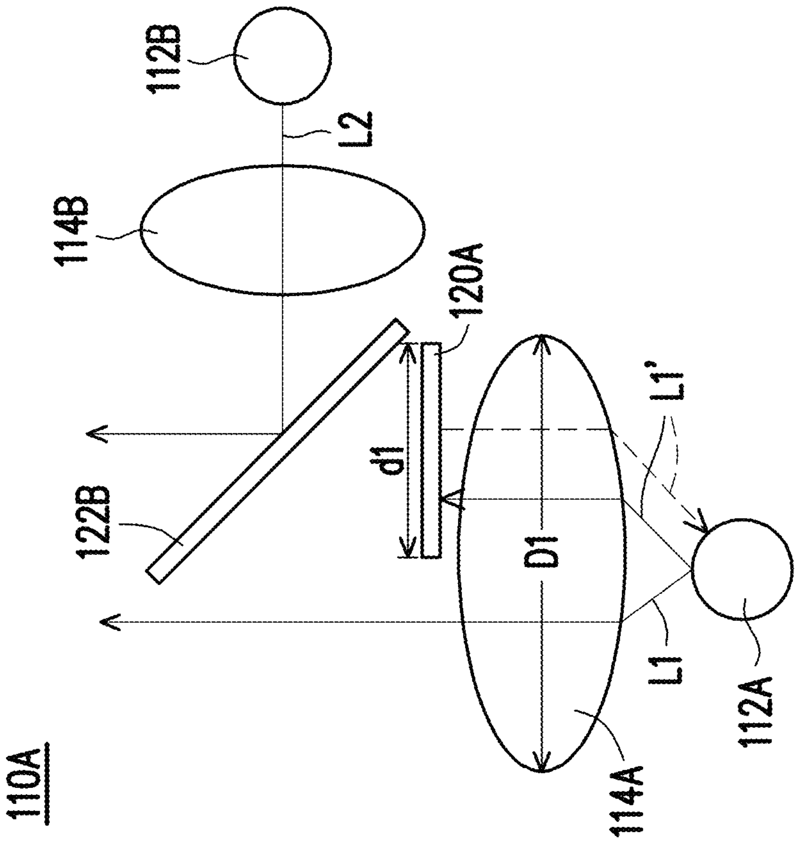
FIG. 2 is a schematic diagram of an illuminating device according to some embodiments of the disclosure.

FIG. 2 is a schematic diagram of an illuminating device according to some embodiments of the disclosure. A light source module 110A is an embodiment of the light source module 110 in FIG. 1. The light source module 110A includes a first light source 112A and a second light source 112B. The first light source 112A is for generating the first light beam L1. The second light source 112B is for generating the second light beam L2. In some embodiments, each of the first light beam L1 and the second light beam L2 is a white light. In some embodiments, the first light beam L1 and the second light beam L2 have the same color temperature. For example, both the first light beam L1 and the second light beam L2 may have a color temperature of 6000K.

In terms of vehicle illumination, a light beam needed for low beam illumination need to have a uniform brightness and a wide lighting range when it comes to the property of the light beam. A light beam needed for high beam illumination need to have high brightness and a limited lighting range when it comes to the property of the light beam. Therefore, the first light beam L1 and the second light beam L2 need to meet different properties.

On the other hand, in the field of optics, an etendue of a light beam is related to a cross-sectional area through which the light beam passes and a corresponding solid angle, that is, the etendue is proportional to a product of the cross-sectional area through which the light beam passes and the corresponding solid angle. In some embodiments, the first light beam L1 has a first etendue and the second light beam L2 has a second etendue, and the first etendue is greater than the second etendue. As a result, the first light beam L1 with the greater etendue has a wider lighting range and is for providing a wider and more uniform projection, which makes the first light beam L1 suitable for providing low beam illumination. The second light beam L2 with the smaller etendue has a more limited lighting range and is for providing a more limited and focused projection, which makes the second light beam L2 suitable for providing high beam illumination.

In some embodiments, the first light source 112A includes a light-emitting diode array, phosphor, or one other light source that can emit a light beam with a greater etendue. However, the disclosure is not limited thereto. In some embodiments, the second light source 112B is a laser or one other light source that emits a light beam with a smaller etendue. However, the disclosure is not limited thereto.

In some embodiments, the ratio of the first etendue to the second etendue is 10-50, but the disclosure is not limited thereto. There may be other ranges depending on the actual requirements. For example, in some embodiments, the first light beam L1 generated by the first light source 112A passes through a cross-sectional area of 3.5 mm×1.4 mm, and a positive or a negative angle between the light beam and an optical axis is 80 degrees, making a corresponding etendue 14.9. The second light beam L2 generated by the second light source 112B passes through a cross-sectional area of 1.0 mm×0.5 mm, and a positive or a negative angle between the light beam and an optical axis is 30 degrees, making a corresponding etendue 0.4.

As shown in FIG. 2, the light source module 110A further includes a first light receiving element 114A and a second light receiving element 114B. The first light receiving element 114A is located on an optical path of the first light beam L1 for converging the first light beam L1. The second light receiving element 114B is located on an optical path of the second light beam L2 for converging the second light beam L2.

In some embodiments, the first light receiving element 114A is a focusing lens or a collimating lens or one other optical element having similar characteristics, but the disclosure is not limited thereto. Therefore, when the first light beam L1 passes through the first light receiving element 114A, the first light beam L1 may be converged through a focusing or collimating effect of the first light receiving element 114A. In some embodiments, the first light source 112A may be located at a focal point of the first light receiving element 114A to enable the first light receiving element 114A with a better focusing or collimating effect.

In some embodiments, the second light receiving element 114B is a focusing lens or a collimating lens or one other optical element having similar characteristics, but the disclosure is not limited thereto. Therefore, when the second light beam L2 passes through the second light receiving element 114B, the second light beam L2 may be converged through a focusing or collimating effect of the second light receiving element 114B. In some embodiments, the second light source 112B may be located at a focal point of the second light receiving element 114B to enable the second light receiving element 114B with a better focusing or collimating effect.

In some embodiments, an effective focal length (EFL) of the first light receiving element 114A is not equal to an EFL of the second light receiving element 114B. Due to the first light receiving element 114A and the second light receiving element 114B having different EMLs, the first light receiving element 114A and the second light receiving element 114B are capable of converging a light beam in different ways depending on the requirements, and further increasing or decreasing a projection range as well as an intensity of brightness and an intensity of energy.

In some embodiments, the first light beam L1 generated by the first light source 112A has a higher brightness than a needed brightness. Thus, the brightness of the first light beam L1 needs to be adjusted. Please refer to FIG. 2. The light source module 110A further includes a reflective element 120A. The reflective element 120A is located on the optical path of the first light beam L1 and at a downstream of the first light receiving element 114A. The reflective element 120A is for reflecting a light beam L1', which is partial of the first light beam L1.

The reflective element 120A reflects the partial light beam L1' of the first light beam L1 to enable the first light beam L1 with an appropriate intensity. On the other hand, the partial light beam L1' reflected by the reflective element 120A may return to the first light source 112A through the light receiving element 114A. That is, the light beam L1' may be retrieved to the first light source 112A through this path.

By adjusting the reflective element 120A, a proportion of reflection relative to a proportion of penetration of the first light beam L1 through the first light receiving element 114A on an optical path can be adjusted. By adjusting the proportions of reflection and penetration of the first light beam L1 through the first light receiving element 114A, a projection with a wider range and a more uniform brightness generated corresponding to the first light beam L1 may be adjusted. For example, the more the proportion of the first light beam L1 penetrating the first light receiving element 114A, the brighter the projection generated by the first light beam L1.

According to some embodiments, the reflective element 120A may be a reflector, an optical element having a metallic reflective coating, or one other element having similar functions. The disclosure is not limited thereto. In some embodiments, a width d1 of the reflective element 120A on an optical axis of the first light beam L1 is less than or equal to a half of a width D1 of the light receiving element 114A on the optical axis of the first light beam L1. In some embodiments, the reflective element 120A may be omitted.

In some embodiments, the first light beam L1 emitted from the first light source 112A and the second light beam L2 emitted from the second light source 112B do not have a same direction of travel. Thus, a light combining element is needed to make a direction of travel of the first light beam L1 and a direction of travel of the second light beam L2 the same.

As shown in FIG. 2, the light source module 110A further includes a light combining element 122B. The light combining element 122B is located on the optical path of the second light beam L2. On the other hand, the light combining element 122B is not located on the optical path of the first light beam L1. Thus, the light combining element 122B is only for changing the optical path of the second light beam L2.

The light combining element 122B is located at a downstream of the second light receiving element 114B. When the second light beam L2 is incident on the light combining element 122B and reflected by the light combining element 122B, the direction of travel of the second light beam L2 is parallel to the direction of travel of the first light beam L1.

In some embodiments, the light combining element 122B may be a reflector, an optical element having a metallic reflective coating, or one other element having similar functions. The disclosure is not limited thereto. When the second light beam L2 is incident on the light combining element 122B, the second light beam L2 is reflected by the light combining element 122B and thus has the same direction of travel as the first light beam L1. After the second light beam L2 passes through the light combining element 122B, the first light beam L1 has the same direction of travel as the second light beam L2. In some embodiments, the second light beam L2 is completely included in the first light beam L1.

As a result, as shown with the light source module 110A in FIG. 2, the first light source 112A and the second light source 112B generate the first light beam L1 and the second light beam L2 respectively. After the first light beam L1 passes through the light receiving element 114A, the intensity of the first light beam L1 is controlled by the reflective element 120A. After the second light beam passes through the light receiving element 114B, the optical path of the second light beam is changed by the light combining element 122B. Thus, the second light beam has the same direction of travel as the first light beam L1. Subsequently, the first light beam L1 and the second light beam L2 are incident on the display module 130 (as shown in FIG. 1).

Figure 3:
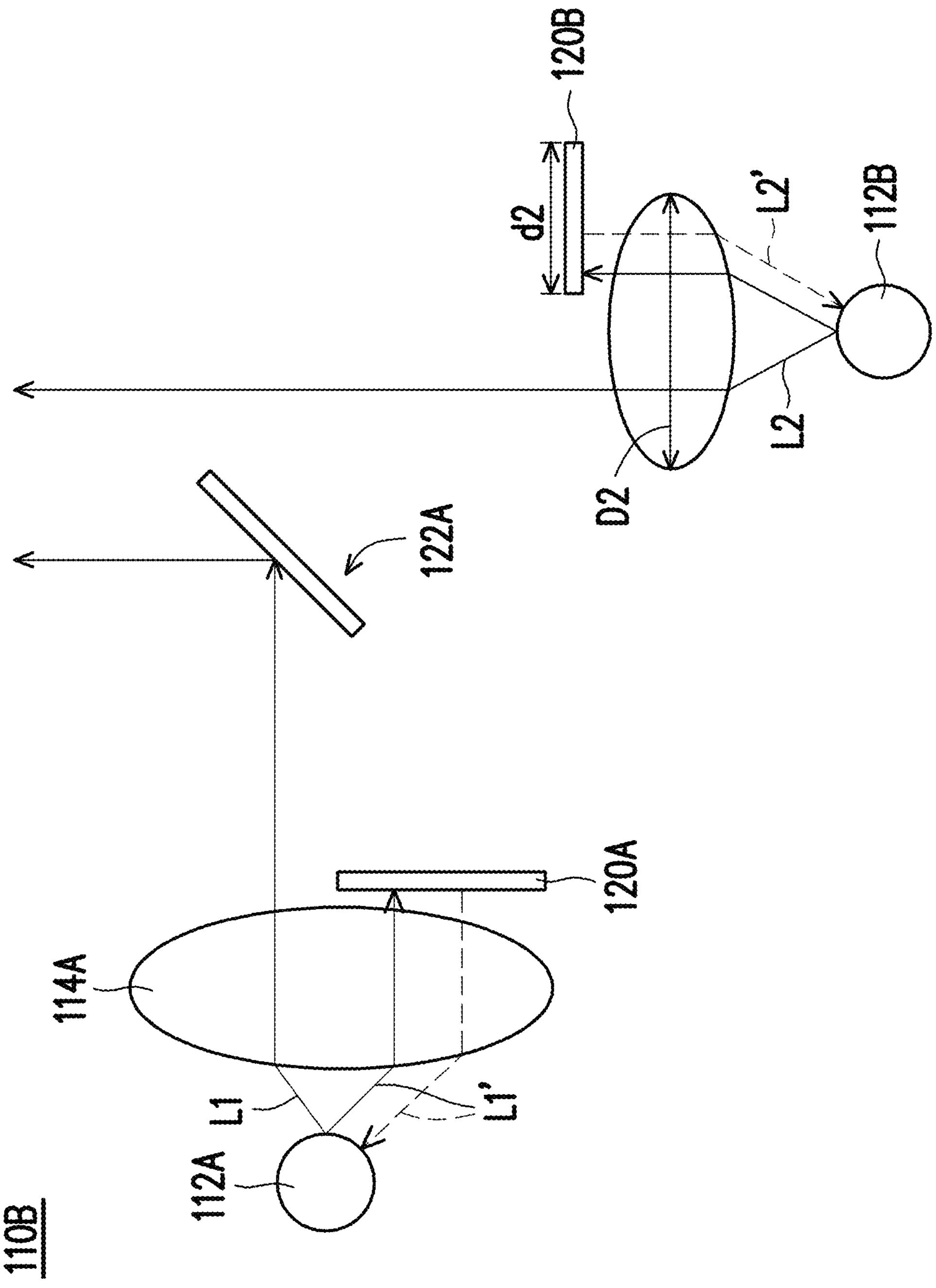
FIG. 3 is a schematic diagram of an illuminating device according to some embodiments of the disclosure.

FIG. 3 is a schematic diagram of an illuminating device according to some embodiments of the disclosure. A light source module 110B is an embodiment of the light source module 110 in FIG. 1. As the light source module 110B has a similar structure to the light source module 110A shown in FIG. 2, the similarities will not be described herein. Differences between the light source module 110B and the light source module 110A are described below.

As shown in FIG. 3, the light source module 110B includes a reflective element 120B. The reflective element 120B is located on the optical path of the second light beam L2 and at the downstream of the second light receiving element 114B. The reflective element 120B is for reflecting a light beam L2', which is partial of the second light beam L2.

The reflective element 120B reflects the partial light beam L2' of the second light beam L2 to enable the second light beam L2 with an appropriate intensity. On the other hand, the partial light beam L2' reflected by the reflective element 120B may return to the second light source 112B through the light receiving element 114B. That is, the light beam L2' may be retrieved to the second light source 112B through this path.

According to some embodiments, the reflective element 120B may be a reflector, an optical element having a metallic reflective coating, or one other element having similar functions. The disclosure is not limited thereto. In some embodiments, a width d2 of the reflective element 120B on an optical axis of the second light beam L2 is less than or equal to a half of a width D2 of the light receiving element 114B on the optical axis of the second light beam L2. In some embodiments, the reflective element 120B may be omitted.

Compared to the light source module 110A shown in FIG. 2, the light source module 110B does not have the light combining element 122B. As shown in FIG. 3, the light source module 110B further includes a light combining element 122A. The light combining element 122A is located on the optical path of the first light beam L1. On the other hand, the light combining element 122A is not located on the optical path of the second light beam L2. Thus, the light combining element 122A is only for changing the optical path of the first light beam L1.

The light combining element 122A is located at the downstream of the first light receiving element 114A. When the first light beam L1 is incident on the light combining element 122A and reflected by the light combining element 122A, the direction of travel of the first light beam L1 is parallel to the direction of travel of the second light beam L2.

In some embodiments, the light combining element 122A may be a reflector, an optical element having a metallic reflective coating, or one other element having similar functions. The disclosure is not limited thereto. When the first light beam L1 is incident on the light combining element 122A, the first light beam L1 is reflected by the light combining element 122A and thus has the same direction of travel as the second light beam L2. After the first light beam L1 passes through the light combining element 122A, the first light beam L1 has the same direction of travel as the second light beam L2. In some embodiments, the second light beam L2 is completely included in the first light beam L1.

As a result, as shown with the light source module 110B in FIG. 3, the first light source 112A and the second light source 112B generate the first light beam L1 and the second light beam L2 respectively. After the first light beam L1 passes through the light receiving element 114A, the intensity of the first light beam L1 is controlled by the reflective element 120A, and the optical path is changed by the light combining element 122A. Thus, the first light beam L1 has the same direction of travel as the second light beam L2. After the second light beam L2 passes through the light receiving element 114B, the intensity of the second light beam L2 is controlled by the reflective element 120B. Subsequently, the first light beam L1 and the second light beam L2 are incident on the display module 130 (as shown in FIG. 1).

In the light source module 110A and the light source module 110B, the first light beam L1 emitted by the first light source 112A and the second light beam L2 emitted by the second light source 112B shown in FIG. 2 and FIG. 3 are approximately perpendicular to each other. In some embodiments, the first light beam emitted by the first light source and the second light beam emitted by the second light source are approximately parallel or opposite to each other.

Figure 4:
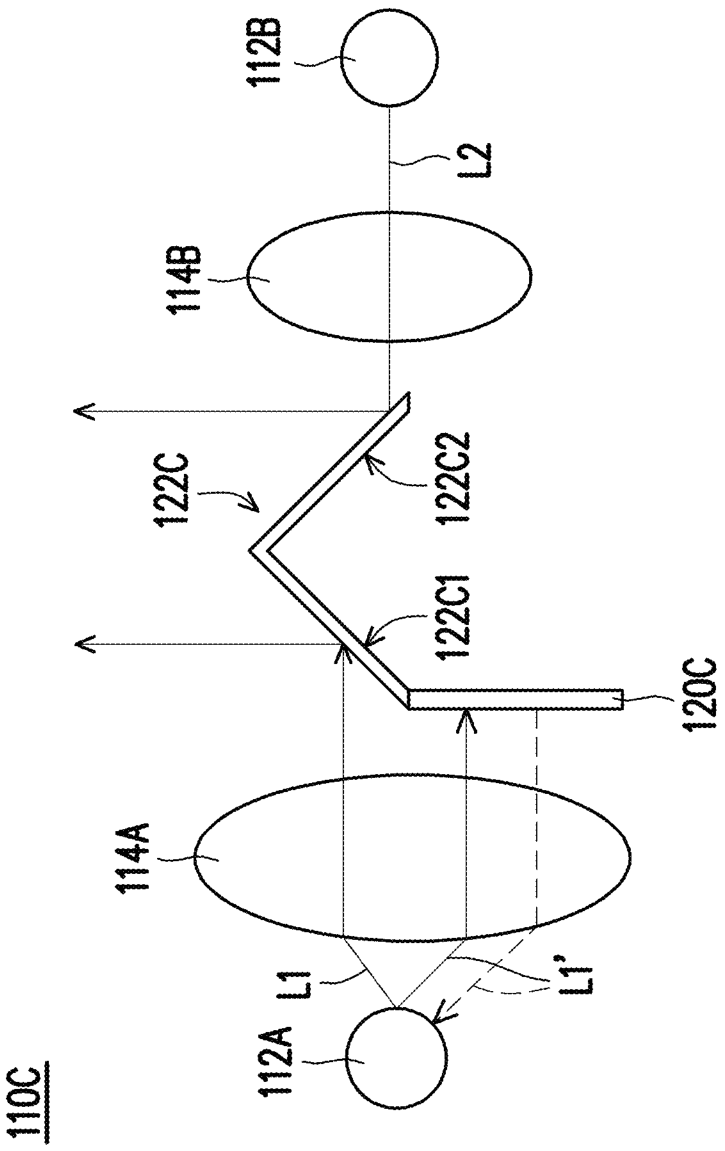
FIG. 4 is a schematic diagram of an illuminating device according to some embodiments of the disclosure.

FIG. 4 is a schematic diagram of an illuminating device according to some embodiments of the disclosure. A light source module 110C is an embodiment of the light source module 110 in FIG. 1. As the light source module 110C has a similar structure to the light source module 110A shown in FIG. 2, the similarities will not be described herein. Differences between the light source module 110C and the light source module 110A are described below.

In the light source module 110A shown in FIG. 2, a light emitting direction of the first light source 112A and a light emitting direction of the second light source 112B are approximately perpendicular to each other. On the contrary, the first light source 112A and the second light source 112B of the light source module 110C shown in FIG. 4 are configured opposite to each other, making the light emitting direction of the first light source 112A and the light emitting direction the second light source 112B parallel to each other.

The first light source 112A and the second light source 112B generate the first light beam L1 and the second light beam L2 respectively. After the first light beam L1 passes through the light receiving element 114A, the intensity of the first light beam L1 is controlled by the reflective element 120A, and the first light beam L1 is incident on a light combining element 122C. After the second light beam L2 passes through the light receiving element 114B, the second light beam L2 is incident on the light combining element 122C.

As shown in FIG. 4, the light combining element 122C is located on the optical path of the first light beam L1 and the optical path of the second light beam L2. The light combining element 122C is also located at the downstream of the first light receiving element 114A and the downstream of the second light receiving element 114B. When the first light beam L1 and the second light beam L2 are respectively incident on the light combining element 122C and reflected by the light combining element 122C, the direction of travel of the first light beam L1 is parallel to the direction of travel of the second light beam L2. After the first light beam L1 and the second light beam L2 pass through the light combining element 122C, the first light beam L1 has the same direction of travel as the second light beam L2. In some embodiments, the second light beam L2 is completely included in the first light beam L1.

Specifically, the first light beam L1 is incident on a first surface 122C1 of the light combining element 122C and reflected by the first surface 122C1. The second light beam L2 is incident on a second surface 122C2 of the light combining element 122C and reflected by the second surface 122C2. The first light beam L1 reflected by the first surface 122C1 and the second light beam L2 reflected by the second surface 122C2 have the same direction of travel and are incident on the display module 130 (as shown in FIG. 1).

In some embodiments, the light combining element 122C may be a reflector having two different reflective surfaces or one other element having similar functions, but the disclosure is not limited thereto.

In this embodiment, the light source module 110C has a reflective element 120C, which is similar to the reflective element 120A of the light source module 110A shown in FIG. 2 and is used for reflecting the partial light beam L1' of the first light beam L1 to enable the first light beam L1 with an appropriate intensity. In some embodiments, the reflective element 120C is part of the light combining element 122C. This is for reducing the number of elements of the light source module 110C.

According to some embodiments, the reflective element 120C may be a reflector, an optical element having a metallic reflective coating, or one other element having similar functions. The disclosure is not limited thereto.

As a result, as shown with the light source module 110C in FIG. 4, the first light source 112A and the second light source 112B generate the first light beam L1 and the second light beam L2 respectively. After the first light beam L1 passes through the light receiving element 114A, the intensity of the first light beam L1 is controlled by the reflective element 120C, and the optical path of the first light beam L1 is changed as the first light beam L1 is reflected by the first surface 122C1 of the light combining element 122C. After the second light beam L2 passes through the light receiving element 114B, the optical path of the second light beam L2 is changed as the second light beam L2 is reflected by the second surface 122C2 of the light combining element 122C. After the optical path of the first light beam L1 is changed by the light combining element 122C, the first light beam L1 has the same direction of travel as the second light beam L2. Subsequently, the first light beam L1 and the second light beam L2 are incident on the display module 130 (as shown in FIG. 1).

Figure 5:
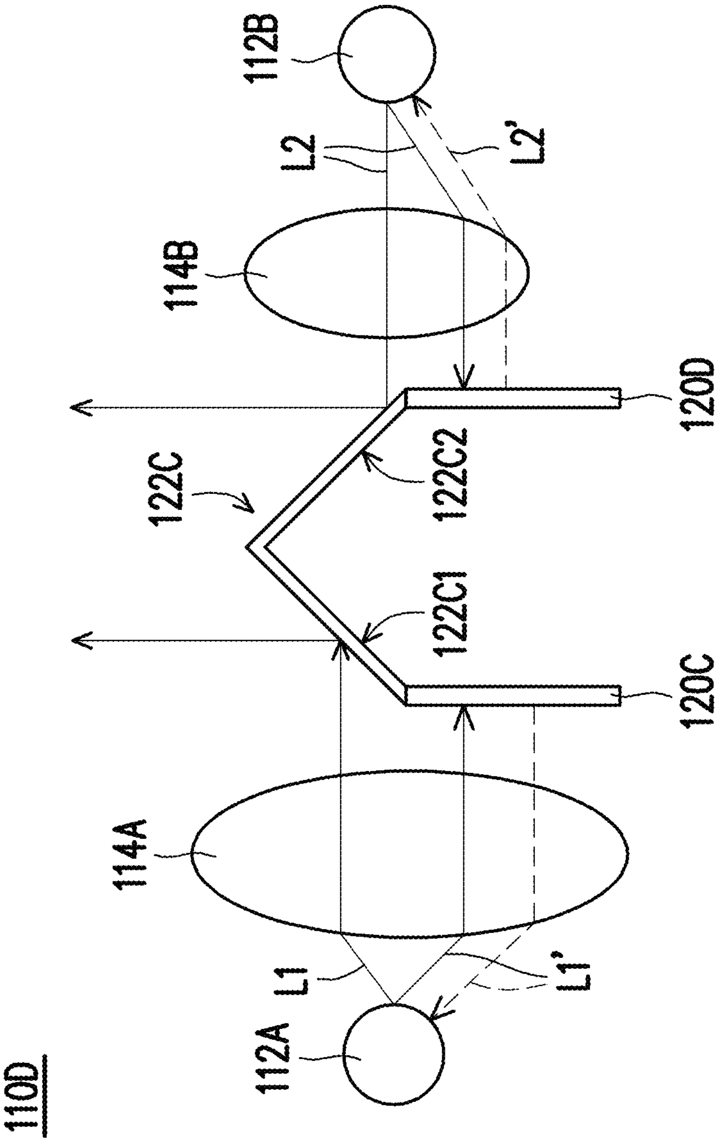
FIG. 5 is a schematic diagram of an illuminating device according to some embodiments of the disclosure.

FIG. 5 is a schematic diagram of an illuminating device according to some embodiments of the disclosure. A light source module 110D is an embodiment of the light source module 110 in FIG. 1. As the light source module 110D has a similar structure to the light source module 110C shown in FIG. 4, the similarities will not be described herein. Differences between the light source module 110D and the light source module 110C are described below.

In this embodiment, the light source module 110D further has a reflective element 120D, which is similar to the reflective element 120B of the light source module 110B shown in FIG. 3 and is used for reflecting the partial light beam L2' of the second light beam L2 to enable the second light beam L2 with an appropriate intensity. In some embodiments, the reflective element 120D is part of the light combining element 122C. This is for reducing the number of elements of the light source module 110D.

According to some embodiments, the reflective element 120D may be a reflector, an optical element having a metallic reflective coating, or one other element having similar functions. The disclosure is not limited thereto.

As a result, as shown with the light source module 110D in FIG. 5, the first light source 112A and the second light source 112B generate the first light beam L1 and the second light beam L2 respectively. After the first light beam L1 passes through the light receiving element 114A, the intensity of the first light beam L1 is controlled by the reflective element 120C, and the optical path of the first light beam L1 is changed as the first light beam L1 is reflected by the first surface 122C1 of the light combining element 122C. After the second light beam L2 passes through the light receiving element 114B, the intensity of the second light beam L2 is controlled by the reflective element 120D, and the optical path of the second light beam L2 is changed as the second light beam L2 is reflected by the second surface 122C2 of the light combining element 122C. After the optical path of the first light beam L1 is changed by the light combining element 122C, the first light beam L1 has the same direction of travel as the second light beam L2. Subsequently, the first light beam L1 and the second light beam L2 are incident on the display module 130 (as shown in FIG. 1).

Figure 6:
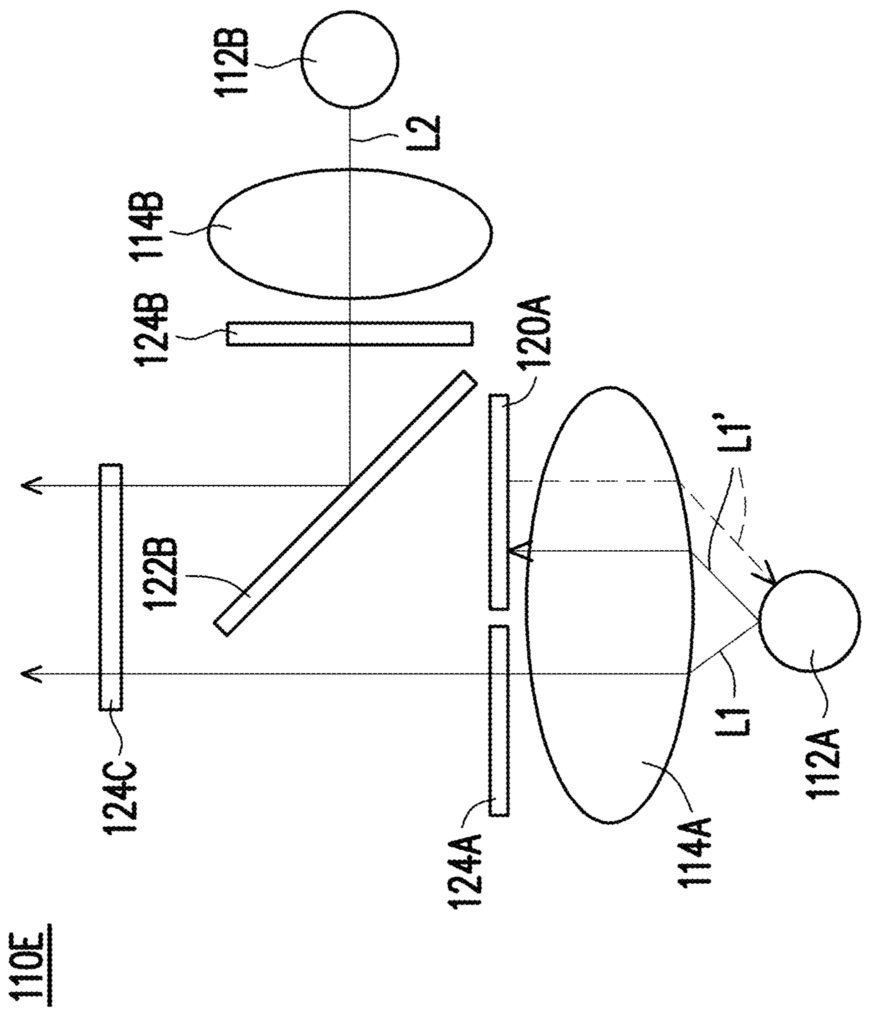
FIG. 6 is a schematic diagram of an illuminating device according to some embodiments of the disclosure.

FIG. 6 is a schematic diagram of an illuminating device according to some embodiments of the disclosure. A light source module 110E is an embodiment of the light source module 110 in FIG. 1. As the light source module 110E has a similar structure to the light source module 110A shown in FIG. 2, the similarities will not be described herein. Differences between the light source module 110E and the light source module 110A are described below.

In order to enable the first light beam L1 and the second light beam L2 emitted by the light source module 110E with a uniform brightness, a diffusion element may be added at an appropriate position to make the energy or brightness of one or both of the first light beam L1 and the second light beam L2 uniform. This is for adjusting an obvious step-wise decrease in brightness between the first light source 110A and the second light source 110B, and to make an overall brightness distribution smoother.

In some embodiments, the light source module 110E includes a diffusion element 124A. The diffusion element 124A is located on the optical path of the first light beam L1 and at the downstream of the first light receiving element 114A to enable the first light beam L1 with a uniform energy distribution.

In some embodiments, the light source module 110E includes a diffusion element 124B. The diffusion element 124B is located on the optical path of the second light beam L2 and at the downstream of the second light receiving element 114B to enable the second light beam L2 with a uniform energy distribution.

In some embodiments, the light source module 110E includes a diffusion element 124C. The diffusion element 124C is located on the optical path of the first light beam L1 and the optical path of the second light beam L2 and at the downstream of the first light receiving element 114A and the downstream of the second light receiving element 114B to enable the first light beam L1 and the second light beam L2 with a uniform energy distribution.

In some embodiments, any one of the diffusion element 124A, the diffusion element 124B, or the diffusion element 124C may be added depending on the actual requirements. However, the disclosure is not limited thereto. In some embodiments, the diffusion element 124A, the diffusion element 124B, or the diffusion element 124C may be configured in any one of the aforementioned light source modules 110A to 110D, and the disclosure is not limited thereto.

Figure 7:
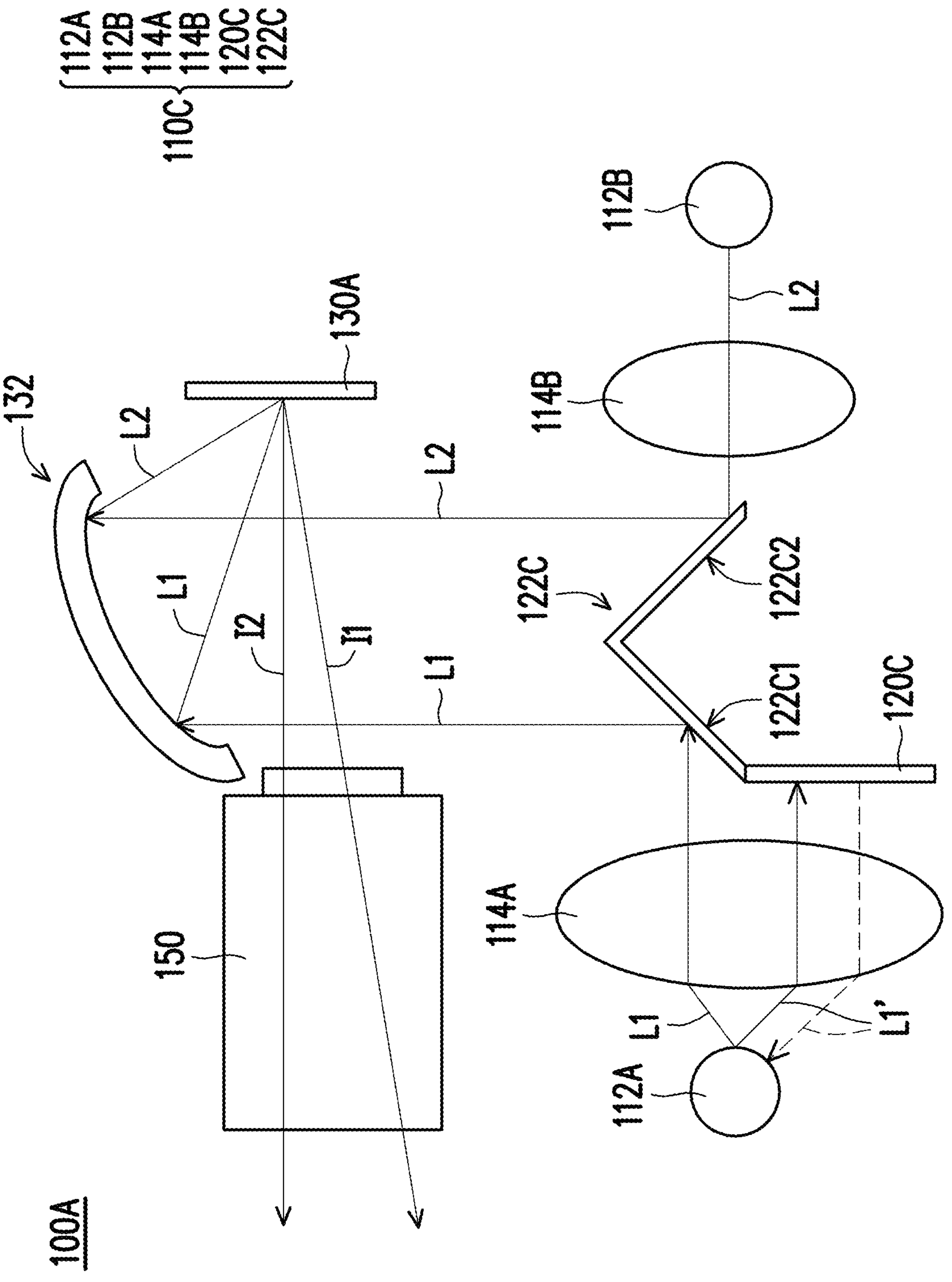
FIG. 7 is a schematic diagram of an illuminating device according to some embodiments of the disclosure.

FIG. 7 is a schematic diagram of an illuminating device according to some embodiments of the disclosure. As shown in FIG. 7, an illuminating device 100A includes a light source module 110C, a display module 130A, and the projection module 150.

The light source module 110C is for generating the first light beam L1 and the second light beam L2. A structure of the light source module 110C is shown in FIG. 4 and will not be described herein. In other embodiments, the light source module may be any one of the light source modules 110A to 110E shown in FIGS. 2 to 6, and the disclosure is not limited thereto.

The first light beam L1 and the second light beam L2 emitted by the light source module 110C are incident on a reflector 132, and then reflected by the reflector 132 to the display module 130A. The reflector 132 is for changing the optical path of the first light beam L1 and the optical path of the second light beam L2 to achieve an effect of reducing a system volume. In some embodiments, the reflector 132 may be a curved reflector or one other optical element having similar characteristics, but the disclosure is not limited thereto.

The first light beam L1 and the second light beam L2 are reflected by the reflector 132 and then incident on the display module 130A. The display module 130A receives the first light beam L1 and the second light beam L2, and generates the first image beam I1 corresponding to the first light beam L1 and the second image beam I2 corresponding to the second light beam L2. The display module 130A is an embodiment of the display module 130 in FIG. 1. In this embodiment, the display module 130A is a digital mirror device (DMD). In this embodiment, light emitting surfaces of the first light source 112A and the second light source 112B are in an object-image relationship with the display module 130A, i.e., the DMD. In other words, both the light emitting surfaces of the first light source 112A and the second light source 112B are magnified and imaged on the display module 130A.

The first image beam I1 and the second image beam I2 emitted by the display module 130A are incident on the projection module 150. The projection module 150 is located on the optical path of the first image beam I1 and the optical path of the second image beam I2, and for projecting the first image beam I1 and the second image beam I2. In some embodiments, the second image beam I2 is completely included in the first image beam I1. In some embodiments, a center of the second image beam I2 overlaps a center of the first image beam I1. According to some embodiments, the projection module 150 is a combination of one or a plurality of optical lenses having a diopter, including, for example, a variety of combinations of biconcave lenses, biconvex lenses, concave-convex lenses, convex-concave lenses, plano-convex lenses, and plano-concave lenses, and other non-planar lenses. A type of the projection module 150 of the disclosure and a sort thereof are not limited.

Figure 8:
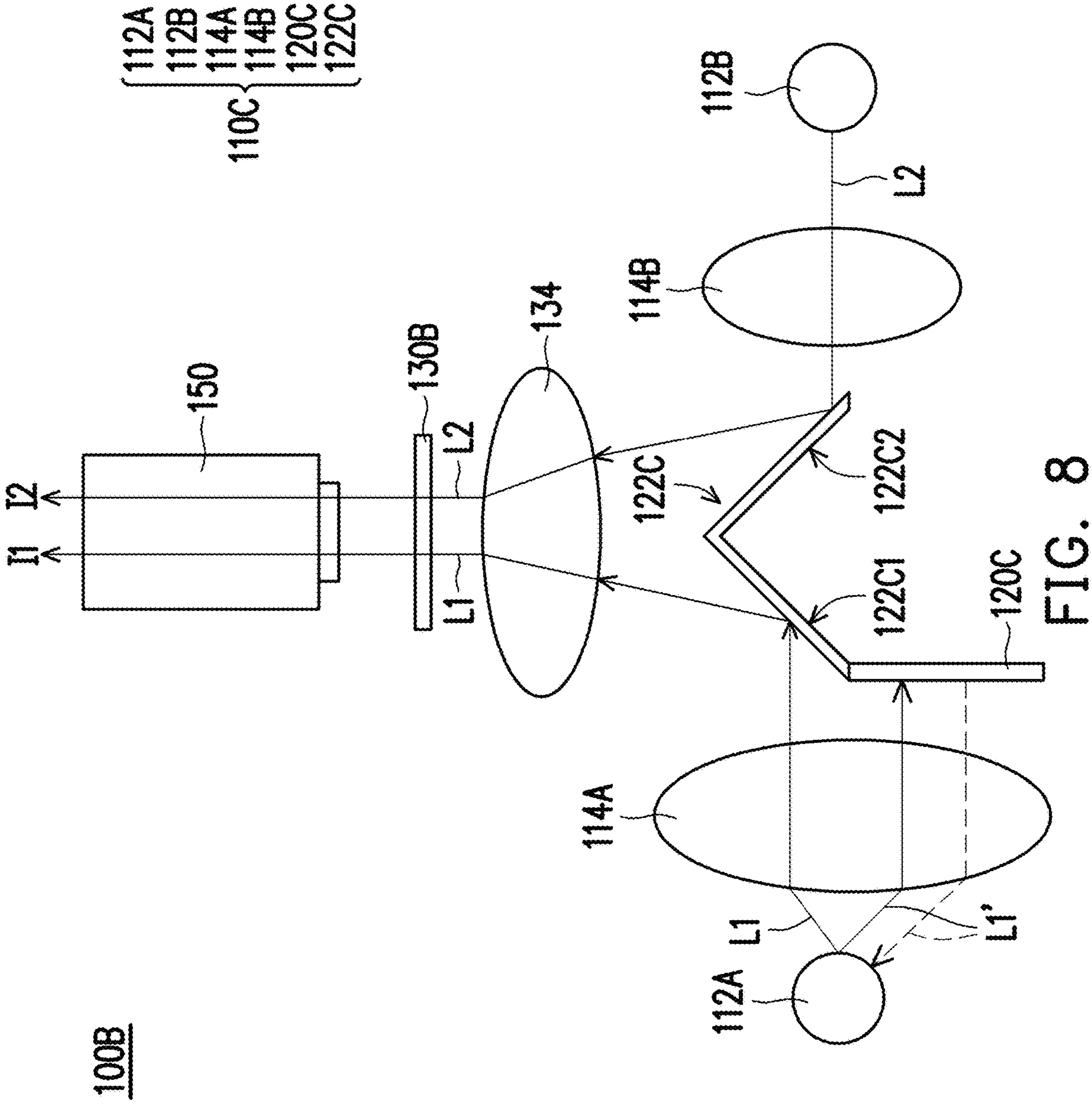
FIG. 8 is a schematic diagram of an illuminating device according to some embodiments of the disclosure.

FIG. 8 is a schematic diagram of an illuminating device according to some embodiments of the disclosure. As shown in FIG. 8, an illuminating device 100B includes the light source module 110C, a display module 130B, and the projection module 150.

The light source module 110C is for generating the first light beam L1 and the second light beam L2. The structure of the light source module 110C is shown in FIG. 4 and will not be described herein. In other embodiments, the light source module may be any one of the light source modules 110A to 110E shown in FIGS. 2 to 6, and the disclosure is not limited thereto.

After the light source module 110C emits the first light beam L1 and the second light beam L2, the first light beam L1 and the second light beam L2 are incident on a lens assembly 134. The lens assembly 134 can be used for changing an optical property of the first light beam L1 and an optical property of the second light beam L2, such as a brightness, a beam width, and the like. In this embodiment, the lens assembly 134 is a combination of one or a plurality of optical lenses having a diopter, including, for example, a variety of combinations of biconcave lenses, biconvex lenses, concave-convex lenses, convex-concave lenses, plano-convex lenses, and plano-concave lenses, and other non-planar lenses. A type of the lens assembly 134 of the disclosure and a sort thereof are not limited. In some embodiments, the lens assembly 134 may also be configured in the illuminating device 100A as shown in FIG. 7 depending on the actual requirements.

The first light beam L1 and the second light beam L2 are incident on the display module 130B after the first light beam L1 and the second light beam L2 penetrate the lens assembly 134. The display module 130B receives the first light beam L1 and the second light beam L2, and generates the first image beam I1 corresponding to the first light beam L1 and the second image beam I2 corresponding to the second light beam L2. The display module 130B is an embodiment of the display module 130 in FIG. 1. In this embodiment, the display module 130B is a penetrating display, such as a liquid crystal display (LCD). In this embodiment, the first light beam L1 and the second light beam L2 penetrate the display module 130B and are converted into the first image beam I1 and the second image beam I2 by the display module 130B.

The first image beam I1 and the second image beam I2 emitted by the display module 130B are incident on the projection module 150. In some embodiments, the second image beam I2 is completely included in the first image beam I1. In some embodiments, the center of the second image beam I2 overlaps the center of the first image beam I1. The functions and configurations of the projection module 150 have been previously introduced and will not be described herein.

Figure 9:
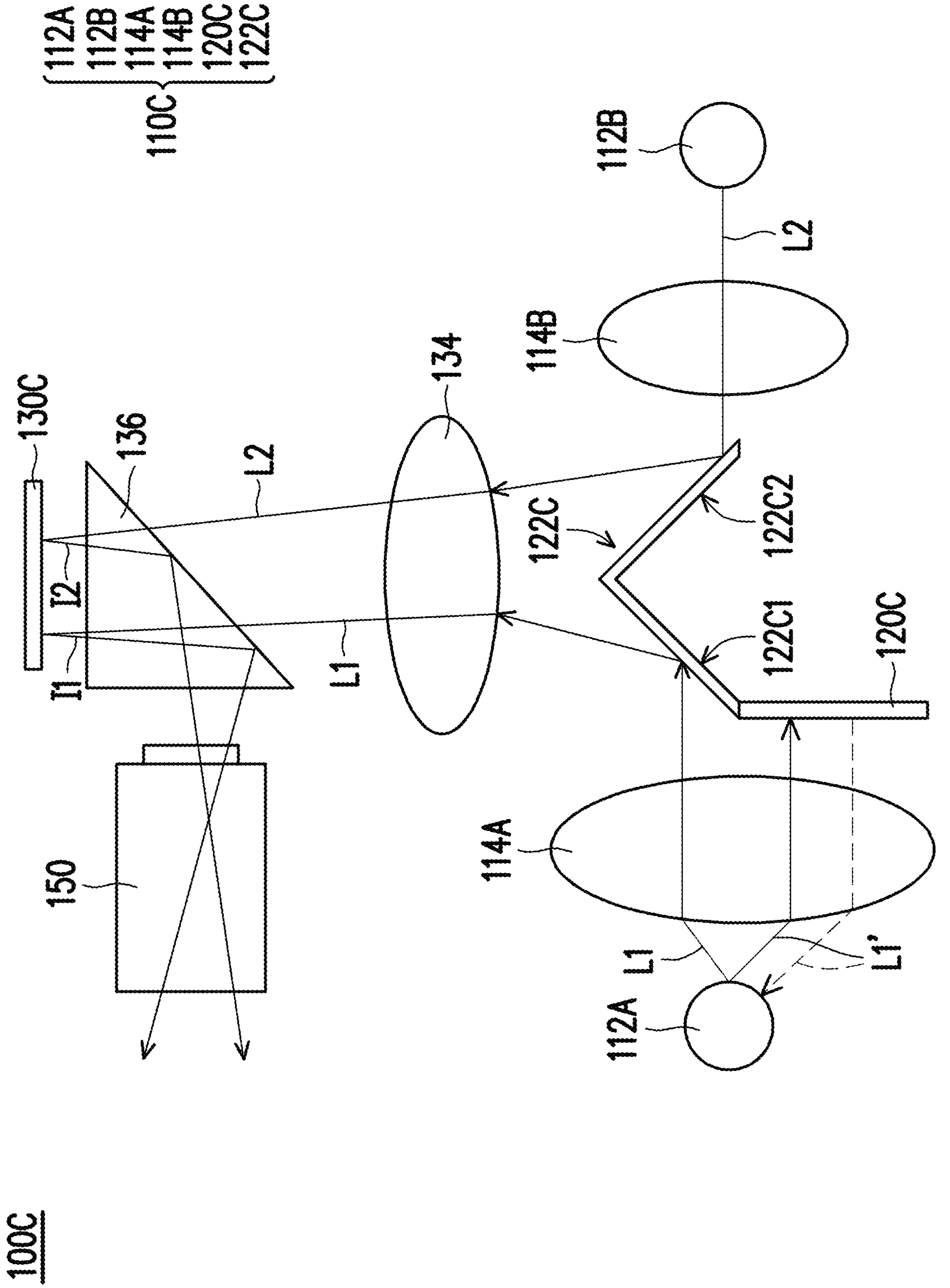
FIG. 9 is a schematic diagram of an illuminating device according to some embodiments of the disclosure.

FIG. 9 is a schematic diagram of an illuminating device according to some embodiments of the disclosure. As shown in FIG. 9, an illuminating device 100C includes the light source module 110C, a display module 130C, and the projection module 150.

The light source module 110C is for generating the first light beam L1 and the second light beam L2. The structure of the light source module 110C is shown in FIG. 4 and will not be described herein. In other embodiments, the light source module may be any one of the light source modules 110A to 110E shown in FIGS. 2 to 6, and the disclosure is not limited thereto.

After the light source module 110C emits the first light beam L1 and the second light beam L2, the first light beam L1 and the second light beam L2 penetrate the lens assembly 134 and are incident on a prism 136. The first light beam L1 and the second light beam L2 are incident on the display module 130C after the first light beam L1 and the second light beam L2 penetrate the prism 136. The prism 136 is for changing the optical path of the first light beam L1 and the optical path of the second light beam L2 to achieve an effect of narrowing the optical path and reducing the system volume. In some embodiments, the illuminating device 100C can have one or more prisms. In some embodiments, the prism 136 may also be configured in the illuminating device 100A as shown in FIG. 7, or in the illuminating device 100B as shown in FIG. 8.

The first light beam L1 and the second light beam L2 are incident on the display module 130C after the first light beam L1 and the second light beam L2 penetrate the prism 136. The display module 130C receives the first light beam L1 and the second light beam L2, and generates a first image beam I1 corresponding to the first light beam L1 and a second image beam I2 corresponding to the second light beam L2. The display module 130C is an embodiment of the display module 130 in FIG. 1. In this embodiment, the display module 130C is a reflective display, such as a liquid crystal display (LCD) or an organic light emitting diode display. In this embodiment, the first light beam L1 and the second light beam L2 are incident on the display module 130C and converted into the first image beam I1 and the second image beam I2 by the display module 130C.

The first image beam I1 and the second image beam I2 emitted by the display module 130C are incident on the projection module 150. In some embodiments, the second image beam I2 is completely included in the first image beam I1. In some embodiments, the center of the second image beam I2 overlaps the center of the first image beam I1. The functions and configurations of the projection module 150 have been previously introduced and will not be described herein.

Figures 10A, 10B, 10C, 10D, 10E, 10F:
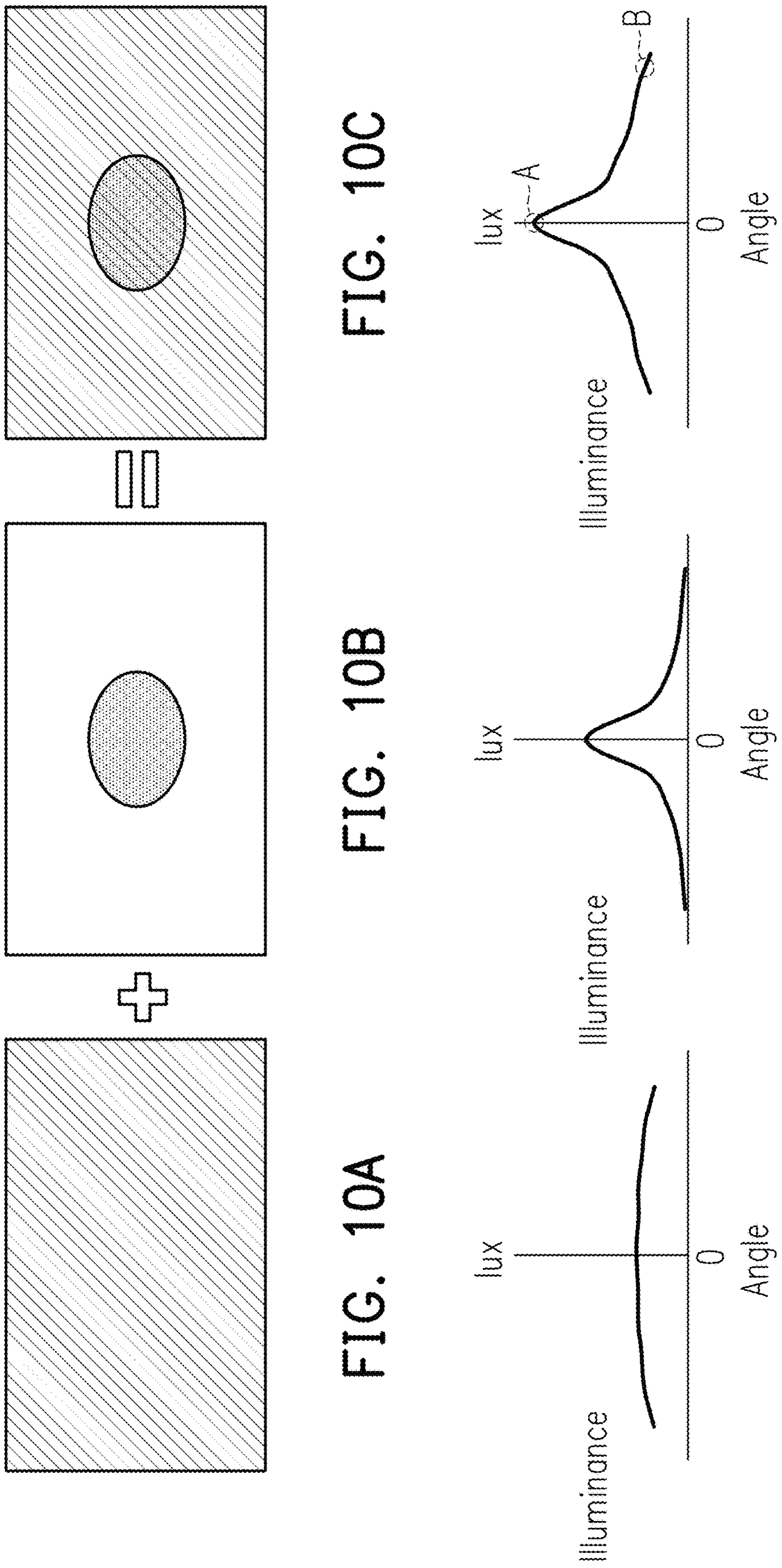
FIGS. 10A to 10F are schematic diagrams of an energy distribution of an image beam according to some embodiments of the disclosure.

FIGS. 10A to 10F are schematic diagrams of an energy distribution of an image beam according to the disclosure. FIGS. 10A to 10C are energy distributions (or brightness distributions) of the first image beam, the second image beam, and the sum of the first image beam and the second image beam, respectively. FIGS. 10D to 10F, each corresponding to FIGS. 10A to 10C, are cross-sectional diagrams of energy distributions (or brightness distributions) of the first image beam, the second image beam, and the sum of the first image beam and the second image beam, respectively.

As previously described in FIGS. 2 to 6, the first light beam L1 and the second light beam L2 emitted by the light source modules 110A to 110E have different etendues. The first light beam L1 has a greater etendue as the second light beam L2 has a smaller etendue. In FIGS. 7 to 9, the first light beam L1 and the second light beam L2 are converted into the first image beam I1 and the second image beam I2, respectively, by the display module 130A, the display module 130B, or the display module 130C, and are projected into the environment by the projection module 150.

In FIG. 10A, the energy distribution of the first image beam I1 is rectangular. As can be seen in FIG. 10D, the energy distribution of the first image beam I1 is uniform, peaking at an angle of 0 degree and bottoming at both sides. That is, the first image beam I1 can be used for providing a wide range of a relatively uniform projection. In FIG. 10B, the energy distribution of the second image beam I2 is oval. As can be seen in FIG. 10E, the energy distribution of the second image beam I2 is concentrated around an angle of 0 degree. That is, the second image beam I2 can be used for providing a limited range of a relatively concentrated projection. In other embodiments, the energy distributions of the first image beam I1 and the energy distribution of the second image beam I2 may also be of other shapes. The disclosure is not limited thereto.

As can be seen in FIG. 10A, FIG. 10B, FIG. 10D, and FIG. 10E, comparing the energy distributions of the first image beam I1 and the second image beam I2, the energy distribution of the second image beam I2 has a smaller range than the energy distribution of the first image beam I1. The energy distribution of the first image beam I1 has a larger area and is more uniform compared to the energy distribution of the second image beam I2. On the other hand, the energy distribution of the second image beam I2 has a smaller area and is more concentrated compared to the energy distribution of the first image beam I1. These distributions correspond to FIGS. 2 to 6, according to which the first light beam L1 has a first etendue and the second light beam L2 has a second etendue, and the first etendue is greater than the second etendue.

FIG. 10C is a superposition of the energy distributions of the first image beam I1 and the second image beam I2. FIG. 10F is a cross-sectional diagram of FIG. 10C. The first image beam I1 and the second image beam I2, when superposed, are the distributions of energy emitted by the light source modules 110A to 110E. As shown in FIG. 10, the second image beam I2 is completely included in the first image beam I1. In some embodiments, the center of the second image beam I2 overlaps the center of the first image beam I1. In some embodiments, M is defined as an illuminance intensity at a center point of a projected scene (as shown at Point A in FIG. 10F)/an illuminance intensity at an edge of the projected scene (as shown at Point B in FIG. 10F). In practical applications, an M value has to fall within a certain range. The M value being too large can result in a brightness of the center point being too high, which causes an excessive contrast between the brightness of the center point and a brightness of the edge. The M value being too small, on the other hand, results in an unobvious difference between the center point and the edge of the scene, making it impossible to clearly distinguish the difference between the center point and the edge of the scene. As a result, in some embodiments, a range of M is $3.5 \geq M \geq 17$, but the disclosure is not limited thereto.

As shown in FIGS. 10C and 10F, when the first image beam I1 and the second image beam I2 are combined, a uniform energy distribution in a large range, in which some parts have a property of a concentrated energy distribution, can be obtained. Thus, an effect suitable for both low beam illumination and high beam illumination is achieved at the same time.

In summary, the illuminating device described in the disclosure utilizes light sources with different etendues to present a required energy distribution on the projected scene. In addition, by reducing the optical path, a plurality of groups of light sources are combined into the illuminating device and projected into the environment.

What is claimed is:

1. An illuminating device, comprising:
- a first light source for generating a first light beam;
- a second light source for generating a second light beam;
- a first light receiving element located on an optical path of the first light beam, wherein the first light receiving element is used for converging the first light beam;
- a second light receiving element located on an optical path of the second light beam, wherein the second light receiving element is used for converging the second light beam;
- a display module located on the optical path of the first light beam and the optical path of the second light beam, wherein the display module receives the first light beam and the second light beam and generates a first image beam corresponding to the first light beam and a second image beam corresponding to the second light beam; and
- a projection module located on an optical path of the first image beam and an optical path of the second image beam, wherein the projection module is used for projecting the first image beam and the second image beam,
- the first light beam having a first etendue and the second light beam having a second etendue, wherein the first etendue is greater than the second etendue.

2. The illuminating device of claim 1, wherein a ratio of the first etendue to the second etendue is 10-50.

3. The illuminating device of claim 1, wherein the first light source is a light-emitting diode array or a phosphor.

4. The illuminating device of claim 1, wherein the second light source is a laser.

5. The illuminating device of claim 1, wherein each of the first light beam and the second light beam is a white light.

6. The illuminating device of claim 1, wherein the first light receiving element is a focusing lens or a collimating lens.

7. The illuminating device of claim 1, wherein the second light receiving element is a focusing lens or a collimating lens.

8. The illuminating device of claim 1, wherein an effective focal length of the first light receiving element is not equal to an effective focal length of the second light receiving element.

9. The illuminating device of claim 1, further comprising a reflective element, wherein the reflective element is located on the optical path of the first light beam and at a downstream of the first light receiving element, the reflective element being used for reflecting a part of the first light beam.

10. The illuminating device of claim 1, further comprising a reflective element, wherein the reflective element is located on the optical path of the second light beam and at a downstream of the second light receiving element, the reflective element being used for reflecting a part of the second light beam.

11. The illuminating device of claim 1, further comprising a light combining element, wherein the light combining element is located on the optical path of the first light beam, the light combining element being located at a downstream of the first light receiving element, wherein a direction of travel of the first light beam is parallel to a direction of travel of the second light beam in response to the first light beam being incident on the light combining element and reflected by the light combining element.

12. The illuminating device of claim 1, further comprising a light combining element, wherein the light combining element is located on the optical path of the second light beam, the light combining element being located at a downstream of the second light receiving element, wherein a direction of travel of the second light beam is parallel to a direction of travel of the first light beam in response to the second light beam being incident on the light combining element and reflected by the light combining element.

13. The illuminating device of claim 1, further comprising a light combining element, wherein the light combining element is located on the optical path of the first light beam and the optical path of the second light beam, the light combining element being located at a downstream of the first light receiving element and a downstream of the second light receiving element, wherein a direction of travel of the first light beam is parallel to a direction of travel of the second light beam in response to the first light beam and the second light beam being incident on the light combining element and reflected by the light combining element, respectively.

14. The illuminating device of claim 1, further comprising a diffusion element, wherein the diffusion element is located on the optical path of the first light beam and at a downstream of the first light receiving element, the diffusion element being used for enabling the first light beam with a uniform energy distribution.

15. The illuminating device of claim 1, further comprising a diffusion element, wherein the diffusion element is located on the optical path of the second light beam and at a downstream of the second light receiving element, the diffusion element being used for enabling the second light beam with a uniform energy distribution.

16. The illuminating device of claim 1, further comprising a diffusion element, wherein the diffusion element is located on the optical path of the first light beam and the optical path of the second light beam, the diffusion element being located at a downstream of the first light receiving element and a downstream of the second light receiving element, wherein the diffusion element is used for enabling the first light beam and the second light beam with a uniform energy distribution.

17. The illuminating device of claim 1, wherein the display module is a digital mirror device, a penetrating display, or a reflective display.

18. The illuminating device of claim 1, wherein the first image beam comprises the whole second image beam.

* * * * *